US012646949B2

(12) United States Patent
Dos Reis et al.

(10) Patent No.: US 12,646,949 B2
(45) Date of Patent: Jun. 2, 2026

(54) PROCESS FOR CONTROLLING LOW VOLTAGE MICROGRIDS

(71) Applicants:UNIVERSIDADE FEDERAL DE MINAS GERAIS, Belo Horizonte (BR); PETRÓLEO BRASILEIRO S/A—PETROBRAS, Rio de Janeiro (BR); UNIVERSIDADE ESTADUAL PAULISTA JULIO DE MESQUITA FILHO—UNESP, São Paulo (BR)

(72) Inventors: Geovane Luciano Dos Reis, Belo Horizonte (BR); Danilo Iglesias Brandao, Belo Horizonte (BR); Eduardo Verri Liberado, São Paulo (BR)

(73) Assignees: Universidade Federal de Minas Gerais; Petróleo Brasileiro S/A - Petrobras;, Rio de Janeiro (BR); Universidade Estadual Paulista Julio de Mesquita Filho - UNESP, Sao Paulo (BR)

( * ) Notice: Subject to any disclaimer, the term of this patent is extended or adjusted under 35 U.S.C. 154(b) by 238 days.

(21) Appl. No.: 18/474,685

(22) Filed: Sep. 26, 2023

(65) Prior Publication Data

US 2024/0120746 A1 Apr. 11, 2024

(30) Foreign Application Priority Data

Sep. 28, 2022 (BR) ...................... 10 2022 019608 7

(51) Int. Cl.
| | |
|---|---|
| *H02J 3/38* | (2006.01) |
| *H02J 3/18* | (2006.01) |
| *H02J 3/32* | (2006.01) |
| *H02J 3/48* | (2006.01) |
| *H02J 3/50* | (2006.01) |

(52) U.S. Cl.
CPC ................ *H02J 3/48* (2013.01); *H02J 3/381* (2013.01); *H02J 3/50* (2013.01); *H02J 2203/10* (2020.01)

(58) Field of Classification Search
CPC ...... H02J 3/48; H02J 3/50; H02J 3/381; H02J 2203/10
See application file for complete search history.

(56) References Cited

U.S. PATENT DOCUMENTS

| | | | | |
|---|---|---|---|---|
| 12,166,340 | B2 * | 12/2024 | Corbet ..................... | H02H 3/38 |
| 12,322,972 | B2 * | 6/2025 | Brandão ................. | H02J 3/388 |
| 2022/0077688 | A1 * | 3/2022 | Patarroyo ................. | H02J 3/46 |
| 2022/0181865 | A1 * | 6/2022 | Corbet ..................... | H02H 3/04 |

OTHER PUBLICATIONS

Caldognetto et al., Dec. 2015, Power-Based Control of Low-Voltage Microgrids, IEEE J. Emerg. Sel. Topics Power Electron., 3(4):1056-1066.
Dos Reis et al., 2021, Model Free Power Control for Low Voltage AC Dispatchable Microgrids with Multiple Points of Connection, Energies, 14(6390):1-21.
Dos Reis et al., "Model Free Power Control for Low Voltage AC Dispatchable Microgrids with Multiple Points of Connection", Energies, 2021,14, 6390, pp. 1-21.

* cited by examiner

*Primary Examiner* — J. Campbell
(74) *Attorney, Agent, or Firm* — Knobbe, Martens, Olson & Bear, LLP

(57) ABSTRACT

This technology is a process for controlling low voltage microgrids (MGs) with centralized communication, based on the "Power-Based Control" (PBC) technique adapting the same to a modified PBC (MPBC) process. The technology provides the following technical effects: 1) sharing of active power and reactive power proportionally to the capacity of distributed energy resources (DERs) of the MG; 2) power unbalance compensation at the point of common coupling (PCC or PAC in Portuguese); 3) the process can be implemented without knowing the parameters and topology of the power grid; 4) ability to handle the arbitrary connection of inverters in the MG; 5) it makes possible to distinguish between DERs connected to the MG in both types of connection: phase-phase and phase-neutral, wherein single-phase DERs connected arbitrarily between the phases share the amounts of balanced power, while the unbalanced and homopolar powers are steered only to the inverters connected between phase and neutral; 6) it allows the connection of the MG to multiple PCCs and also the operation in isolated mode ("islanded"). The technology is applied in the technical field of equipment and infrastructure for the development of MGs.

1 Claim, No Drawings

1

PROCESS FOR CONTROLLING LOW VOLTAGE MICROGRIDS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. This application claims the benefit of Brazilian Application No. BR 10 2022 019608 7, filed 28 Sep. 2022, the entire contents of which are hereby incorporated by reference.

BACKGROUND

This technology refers to a process for controlling low voltage microgrids (MGs) with centralized communication, based on the "Power-Based Control" (PBC) technique adapting the same to a modified PBC process (MPBC). The technology provides the following technical effects: 1) sharing of active power and reactive power proportionally to the capacity of distributed energy resources (DERs) of the MG; 2) power unbalance compensation at the point of common coupling (PCC or PAC in Portuguese); 3) the control process can be implemented without needing to know the parameters and topology of the power grid; 4) ability to handle the arbitrary connection of inverters in the MG; 5) it makes possible to distinguish between DERs connected to the MG in both types of connection: phase-phase and phase-neutral, wherein single-phase DERs connected arbitrarily between the phases share the amounts of balanced power, while the unbalanced and homopolar powers are steered only to the inverters connected between phase and neutral; 6) it allows the connection of the MG to multiple PCCs and also the operation in isolated mode ("islanded"). The technology is applied in the technical field of equipment and infrastructure for the development of MGs.

The PBC secondary control strategy offers a simple implementation that provides the sharing of active and reactive power proportionally to the capabilities of existing GDs, in addition to controlling the power flow in the grid and compensating for unbalance in the PCC, without the need for prior knowledge of grid parameters or the combination of other techniques, by means of a simple algebraic formulation (T. Caldognetto, S. Buso, P. Tenti, and D. I. Brandao, "," IEEE J. Emerg. Sel. Topics Power Electron., vol. 3, no. 4, pp. 1056-1066, December 2015).

There is no technology in the state of the art that resembles the invention proposed in this patent application, which presents a process that concomitantly achieves the above-listed technical effects 1 to 5 and provides rapid dynamic control responses.

The MPBC process proposed herein does not require detailed information about the MG (for example, line impedances or topology), and, unlike many approaches that use the droop technique applied to MGs, the MPBC process does not require details of the primary control (e.g., details of converter dynamics, current control, phase-locked loop circuit or PLL, etc.), which commonly add complexities to the formulation.

Thus, the MPBC, in a simple way, demands the exchange of information between the central control located in the secondary control layer (central control, CC or "central controller") and the primary control layer (in which the DERs are located) and the tertiary control (in which the distribution system operator or DSO is located).

DETAILED DESCRIPTION OF THE TECHNOLOGY

This technology refers to a control process for low voltage microgrids (MGs) with centralized communication capable of controlling an MG connected to multiple PCCs. The process is based on the "Power-Based Control" (PBC) technique adapting the same to a modified PBC (MPBC) process. The technology provides the following technical effects: 1) sharing of active power and reactive power proportionally to the capacity of distributed energy resources (DERs) of the MG; 2) power unbalance compensation at the point of common coupling (PCC or PAC in Portuguese); 3) the control process can be implemented without needing to previously know the parameters and topology of the MG (i.e., it is a model-free strategy); 4) ability to handle the arbitrary connection of inverters in the MG; 5) it makes possible to distinguish between DERs connected to the MG in both types of connection: phase-phase and phase-neutral, wherein single-phase DERs connected arbitrarily between the phases share the amounts of balanced power, while the unbalanced and homopolar powers are steered only to the inverters connected between phase and neutral; 6) it allows the connection of the MG to multiple PCCs and also the operation in isolated mode ("islanded").

The process for controlling low voltage microgrids (MGs) comprises the following steps:

a) Temporarily delimiting a control cycle l, with the next control cycle defined as $l_1=l+1$;
  b) Assigning the following vectors $P_{CC_x}(l)$ and $Q_{CC_x}(l)$, which are vectors that indicate the active and reactive powers exchanged with the main grid from the three phases of the MG and the respective references $$P^*_{PCC_x}(l_1) \text{ and } Q^*_{PCC_x}(l_1),$$

where the terms with the subscript ($PCC_x$) are provided by the grid at the controlled PCC and terms with superscript (*) indicate the power references for the respective ($PCC_x$) where x is the numeric identification of the PCC in which the control process is applied, and the indices m or mn indicate the phases of the three-phase system in the context of the phase-neutral and phase-phase connection types, respectively;

c) Steering the power references $$\left[ P^*_{PCC_x}(l_1) \text{ and } Q^*_{PCC_x}(l_1), \right]$$

using the central control, located in the secondary control layer, which transmits command instructions to the DERs according to their connection types in the MG, which can be phase-phase or phase-neutral to determine the powers to be generated individually, wherein the powers are calculated by sub-steps i to iv, namely:

i. Homopolar powers $$P^{ho}_{CC_x}(l) \text{ and } Q^{ho}_{PCC_x}(l):$$

3 the power components for these vectors are calculated for each phase of the PCC considering only the homopolar components (ho) of current that are calculated by expression (1);

$$i^{ho} = \frac{1}{3} \sum_{m=1}^{3} i_m \qquad (1)$$

ii. Expression 2 is used to equate the characteristics inherent to homopolar currents, expressions 3 and 4 calculate the vectors of non-homopolar powers (nho) in each phase of the PCC;

$$\sum_{m=1}^{M} P^{ho}_{PCC_xm} = \sum_{m=1}^{M} Q^{ho}_{PCC_xm} = 0 \qquad (2)$$

$$\underline{P}^{nho}_{PCC_x}(l) = \underline{P}_{PCC_x}(l) - \underline{P}^{ho}_{PCC_x}(l) \qquad (3)$$

$$\underline{Q}^{nho}_{PCC_x}(l) = \underline{Q}_{PCC_x}(l) - \underline{Q}^{ho}_{PCC_x}(l) \qquad (4)$$

where M is the number of phases of the $PCC_x$ (in general, M=3);

iii. Balanced powers $$\left(\underline{P}^{b}_{PCC_x}(l) \text{ and } \underline{Q}^{b}_{PCC_x}(l)\right):$$

these vectors represent the portions of power consumed by a balanced load whose total powers are equivalent to the non-homopolar total powers in the $PCC_x$, that is:

$$\sum_{m=1}^{M} P^{b}_{PCC_xm} = \sum_{m=1}^{M} P^{nho}_{PCC_xm}, \sum_{m=1}^{M} Q^{b}_{PCC_xm} = \sum_{m=1}^{M} Q^{nho}_{PCC_xm} \qquad (5)$$

where the powers of the vectors $$\underline{P}^{b}_{PAC_x} \text{ and } \underline{Q}^{b}_{PAC_x}$$

are calculated as:

$$P^{b}_{PAC_xm} = \frac{\sum_{n=1}^{N} P^{nho}_{PAC_xn}}{\sum_{n=1}^{N} V_n^2} \cdot V_m^2, Q^{b}_{PAC_xm} = \frac{\sum_{n=1}^{N} Q^{nho}_{PAC_xn}}{\sum_{n=1}^{N} \hat{V}_n^2} \cdot \hat{V}_m^2, \qquad (6)$$

where V and $\hat{V}$ are the rms values of the phase-neutral voltages measured at the $PCC_x$ and the rms values of the respective voltage integrals, calculated by discounting their average value over time;

iv. The difference between the balanced portion of the power and the non-homopolar portion of the power is calculated, which results in the amount of "unbalanced" power (u) by expressions 7 and 8.

$$\underline{P}^{u}_{PCC_x} = \underline{P}^{nho}_{PCC_x} - \underline{P}^{b}_{PCC_x} \qquad (7)$$

4

-continued $$\underline{Q}^{u}_{PCC_x} = \underline{Q}^{nho}_{PCC_x} - \underline{Q}^{b}_{PCC_x} \qquad (8)$$

wherein, based on equations (5), (7) and (8), it is possible to deduce that:

$$\sum_{m=1}^{M} P^{u}_{PCC_xm} = \sum_{m=1}^{M} Q^{u}_{PCC_xm} = 0; \qquad (9)$$

d) Generating power transformation matrices: for DERs connected to the MG with phase-phase connection, the powers in the phase-phase configuration are converted into their respective phase-neutral values by a transformation that uses matrices A and B, detailed by expressions 10 and 11, and this conversion is made based on the Y-Δ transformations defined for impedance, generalized here in the form of matrices valid for any voltage conditions $$A = \begin{bmatrix} V_1^2 - \langle v_1, v_2 \rangle & 0 & V_1^2 - \langle v_3, v_1 \rangle \\ V_2^2 - \langle v_1, v_2 \rangle & V_2^2 - \langle v_2, v_3 \rangle & 0 \\ 0 & V_3^2 - \langle v_2, v_3 \rangle & V_3^2 - \langle v_3, v_1 \rangle \end{bmatrix} \qquad (10)$$

$$B = \begin{bmatrix} \hat{V}_1^2 - \langle \hat{v}_1, \hat{v}_2 \rangle & 0 & \hat{V}_1^2 - \langle \hat{v}_3, \hat{v}_1 \rangle \\ \hat{V}_2^2 - \langle \hat{v}_1, \hat{v}_2 \rangle & \hat{V}_2^2 - \langle \hat{v}_2, \hat{v}_3 \rangle & 0 \\ 0 & \hat{V}_3^2 - \langle \hat{v}_2, \hat{v}_3 \rangle & \hat{V}_3^2 - \langle \hat{v}_3, \hat{v}_1 \rangle \end{bmatrix} \qquad (11)$$

where $(v_1, v_2, v_3)$, $(\hat{v}_1, \hat{v}_2, \hat{v}_3)$, $(V_1, V_2, V_3)$, $(\hat{V}_1, \hat{V}_1, \hat{V}_1$, are, respectively, the phase-neutral voltages and the corresponding homo-integrals and the respective rms values of the voltages and their homo-integrals, while the operator $\langle , \rangle$ corresponds to the internal product of two quantities that are functions of time, and, thus, with these matrices in hand, the powers between phases (vectors $P_{ff}$ and $Q_{ff}$) can be converted to phase values (vectors $P_{fn}$ and $Q_{fn}$) and vice versa using equations 12 and 13:

$$\underline{P}_{fn} = A \cdot \left(\text{diag}(\underline{V}_{ff})\right)^{-1} \cdot \underline{P}_{ff} \leftrightarrow \underline{P}_{ff} = \text{diag}(\underline{V}_{ff}) \cdot A^{-1} \cdot \underline{P}_{fn} \qquad (12)$$

$$\underline{Q}_{fn} = B \cdot \left(\text{diag}(\underline{\hat{V}}_{ff})\right)^{-1} \cdot \underline{Q}_{ff} \leftrightarrow \underline{Q}_{ff} = \text{diag}(\underline{\hat{V}}_{ff}) \cdot B^{-1} \cdot \underline{Q}_{fn} \qquad (13)$$

where the vectors $V_{ff}$ and $\hat{V}_{ff}$ contain the rms values of the voltages between phases and the respective homo-integrals of the phase-phase voltages, and the function diag ( ) represents the transformation of a vector with m elements into a square matrix of order m whose elements of the main diagonal correspond to the elements of the original vector and the other elements are null.

e) Considering that J distributed generators are in operation in the MG during control cycle l, the quantities of interest of the j-th DER for the control algorithm are:
  Active and reactive powers injected into the microgrid during cycle l: $P_{Gj}(l)$, $Q_{Gj}(l)$;
  Maximum active and reactive powers that the DER can inject into the grid during the cycle l:

$$P^{max}_{Gj}(l) \text{ and } Q^{max}_{Gj}(l);$$

In the case of energy storage systems, there is the minimum active power that can be absorbed from the microgrid in the cycle l;

$$P_{Gj}^{min}(l);$$

f) Performing the steps described below during the control cycle l, considering all information received from the distributed generators in operation and controllable PCCs:

Step 1: sums of active and reactive powers of the J DERs in operation and the X controllable PCCs for each phase m=1,2,3 and pair of phases mn=12,23,31:

$$P_{Gfn_m}(l) = \sum_{j=1}^{J} P_{Gj_m}^*(l), Q_{Gfn_m}(l) \tag{14}$$

$$= \sum_{j=1}^{J} Q_{Gj_m}(l)$$

$$P_{Gff_m}(l) = \sum_{j=1}^{J} P_{Gj_{mn}}(l), Q_{Gff_{mn}}(l) \tag{15}$$

$$= \sum_{j=1}^{J} Q_{Gj_m}(l)$$

$$P_{Gfn_m}^{max}(l) = \sum_{j=1}^{J} P_{Gj_m}^{max}(l), Q_{Gfn_m}^{max}(l) \tag{16}$$

$$= \sum_{j=1}^{J} Q_{Gj_m}^{max}(l)$$

$$P_{Gff_m}^{max}(l) = \sum_{j=1}^{J} P_{Gj_{mn}}^{max}(l), Q_{Gff_{mn}}^{max}(l) \tag{17}$$

$$= \sum_{j=1}^{J} Q_{Gj_m}^{max}(l)$$

$$P_{PCC_m}(l) = \sum_{x=1}^{X} P_{PCC_x m}(l), Q_{PCC_m}(l) \tag{18}$$

$$= \sum_{x=1}^{X} Q_{PCC_x m}(l)$$

$$P_{PCC_m}^*(l_1) = \sum_{x=1}^{X} P_{PCC_x m}^*(l_1) \tag{19}$$

$$= \sum_{x=1}^{X} Q_{PCC_x m}^*(l_1)$$

$$P_{PCC_m}^{ho}(l) = \sum_{x=1}^{X} P_{PCC_x m}^{ho}(l), Q_{PCC_m}^{ho}(l) \tag{20}$$

$$= \sum_{x=1}^{X} Q_{PCC_x m}^{ho}(l)$$

$$P_{PCC_m}^{nho}(l) = \sum_{x=1}^{X} P_{PCC_x m}^{nho}(l), Q_{PCC_m}^{nho}(l) \tag{21}$$

$$= \sum_{x=1}^{X} Q_{PCC_x m}^{nho}(l)$$

$$P_{PCC_m}^b(l) = \sum_{x=1}^{X} P_{PCC_x m}^b(l), Q_{PCC_m}^b(l) \tag{22}$$

-continued $$= \sum_{x=1}^{X} Q_{PCC_x m}^b(l)$$

$$P_{PCC_m}^u(l) = \sum_{x=1}^{X} P_{PCC_x m}^u(l) Q_{PCC_m}^u(l) \tag{23}$$

$$= \sum_{x=1}^{X} Q_{PCC_x m}^u(l)$$

Step 2: the central control calculates the reference values of active and reactive powers for the generators distributed in control cycle $l_1$:

If only the DERs connected between phases are in operation, the power references for the pairs of phases mn=12,23,31 contained in the vectors $P_{Gff}(l_1)$ and $Q_{Gff}(l_1)$ are calculated using:

$$\underline{P}_{Gff}(l_1) = \mathrm{diag}(\underline{V}_{ff}) \cdot \underline{A}^{-1} \cdot \left(\underline{P}_{PCC}^b(l) - \underline{P}_{PCC}^*(l_1)\right) + \underline{P}_{Gff}(l) \tag{24}$$

$$\underline{Q}_{Gff}(l_1) = \mathrm{diag}(\underline{\hat{V}}_{ff}) \cdot \underline{B}^{-1} \cdot \left(\underline{Q}_{PCC}^{nho}(l) - \underline{Q}_{PCC}^*(l_1)\right) + \underline{Q}_{Gff}(l) \tag{25}$$

where the elements of vectors $$\underline{P}_{Gff}(l), \underline{Q}_{Gff}(l), \underline{P}_{PCC}^*(l_1), \underline{Q}_{PCC}^*(l_1), \underline{Q}_{PCC}^{nho}(l) \text{ and } \underline{P}_{PCC}^b(l)$$

are calculated by equations (15), (19), (21) and (22), respectively;

If only the DERs connected between phase and neutral are in operation, the power references for the phases m=1, 2,3 contained in the vectors $P_{Gfn}(l_1)$ and $Q_{Gfn}(l_1)$ are calculated using:

$$\underline{P}_{Gfn}(l_1) = \underline{P}_{PCC}(l) - \underline{P}_{PCC}^*(l_1) + \underline{P}_{Gfn}(l) \tag{26}$$

$$\underline{Q}_{Gfn}(l_1) = \underline{Q}_{PCC}(l) - \underline{Q}_{PCC}^*(l_1) + \underline{Q}_{Gfn}(l) \tag{27}$$

where the elements of the vectors $P_{Gfn}(l)$, $Q_{Gfn}(l)$,$P_{PAC}(l)$ and $Q_{PAC}(l)$ are calculated by equations (14) and (19), respectively;

If distributed generators with both types of connection (phase-phase and phase-neutral) are in operation, a criterion for sharing some portions of active and reactive power is established based on the following coefficients:

$$\underline{c}_P(l) = \left(\mathrm{diag}\left(\underline{P}_{Gfn}^{max}(l) + \underline{P}_{Gfn}^{max'}(l)\right)\right)^{-1} \cdot \underline{P}_{Gfn}^{max}(l) \tag{28}$$

$$\underline{c}_Q(l) = \left(\mathrm{diag}\left(\underline{Q}_{Gfn}^{max}(l) + \underline{Q}_{Gfn}^{max'}(l)\right)\right)^{-1} \cdot \underline{Q}_{Gfn}^{max}(l) \tag{29}$$

where the elements of the vectors $$\underline{P}_{Gfn}^{max}(l) \text{ and } \underline{Q}_{Gfn}^{max}(l)$$

are calculated by equations (16), while the elements of the vectors $$\underline{P}_{Gfn}^{max'}(l) \text{ and } \underline{Q}_{Gfn}^{max'}(l)$$

are calculated by using:

$$\underline{P}_{Gfn}^{max'}(l) = \underline{A} \cdot \left(\text{diag}(\underline{V}_{ff})\right)^{-1} \cdot \underline{P}_{Gff}^{max}(l) \tag{30}$$

$$\underline{Q}_{Gfn}^{max'}(l) = \underline{B} \cdot \left(\text{diag}(\hat{\underline{V}}_{ff})\right)^{-1} \cdot \underline{Q}_{Gff}^{max}(l) \tag{31}$$

where the elements of the vectors $$\underline{P}_{Gff}^{max}(l) \text{ and } \underline{Q}_{Gff}^{max}(l)$$

are calculated by equations (17), and, therefore, the power sharing is defined as:

$$\underline{P}_{fn}^{sh}(l) = \text{diag}(\underline{c}_P(l)) \cdot \left(\underline{P}_{PAC}^b(l) - \underline{P}_{PAC}^*(l_1)\right) \tag{32}$$

$$\underline{Q}_{fn}^{sh}(l) = \text{diag}(\underline{c}_Q(l)) \cdot \left(\underline{Q}_{PAC}^b(l) - \underline{Q}_{PAC}^*(l_1)\right) \tag{33}$$

$$\underline{P}_{fn}^{sh'}(l) = \left(\underline{1} - \text{diag}(\underline{c}_P(l))\right) \cdot \left(\underline{P}_{PAC}^b(l) - \underline{P}_{PAC}^*(l_1)\right) \tag{34}$$

$$\underline{Q}_{fn}^{sh'}(l) = \left(\underline{1} - \text{diag}(\underline{c}_Q(l))\right) \cdot \left(\underline{Q}_{PAC}^b(l) - \underline{Q}_{PAC}^*(l_1)\right) \tag{35}$$

where 1 is the identity matrix, and, finally, the power references for the phases and pairs of phases are calculated as a function of the vectors $$\underline{P}_{fn}^{sh}(l), \underline{Q}_{fn}^{sh}(l), \underline{P}_{fn}^{sh'}(l) \text{ and } \underline{Q}_{fn}^{sh'}(l):$$

$$\underline{P}_{Gfn}(l_1) = \underline{P}_{fn}^{sh}(l) + \underline{P}_{PAC}^u(l) + \underline{P}_{PAC}^{ho}(l) + \underline{P}_{Gfn}(l) \tag{36}$$

$$\underline{Q}_{Gfn}(l_1) = \underline{Q}_{fn}^{sh}(l) + \underline{Q}_{PAC}^u(l) + \underline{Q}_{PAC}^{ho}(l) + \underline{Q}_{Gfn}(l) \tag{37}$$

$$\underline{P}_{Gff}(l_1) = \left(\text{diag}(\underline{V}_{ff}) \cdot \underline{A}^{-1} \cdot \underline{P}_{fn}^{sh'}(l)\right) + \underline{P}_{Gff}(l) \tag{38}$$

$$\underline{Q}_{Gff}(l_1) = \left(\text{diag}(\hat{\underline{V}}_{ii}) \cdot \underline{B}^{-1} \cdot \underline{Q}_{fn}^{sh'}(l)\right) + \underline{Q}_{Gff}(l); \tag{39}$$

Step 3: calculation of power coefficients:

For phases m=1,2,3:

$$\underline{\alpha}_{fn}^P = \left(\text{diag}(\underline{P}_{Gfn}^{max}(l))\right)^{-1} \cdot \underline{P}_{Gfn}(l_1) \tag{40}$$

$$\underline{\alpha}_{fn}^Q = \left(\text{diag}(\underline{Q}_{Gfn}^{max}(l))\right)^{-1} \cdot \underline{Q}_{Gfn}(l_1) \tag{41}$$

For the pairs of phases mn=12,23,31:

$$\underline{\alpha}_{ff}^P = \left(\text{diag}(\underline{P}_{Gff}^{max}(l))\right)^{-1} \cdot \underline{P}_{Gff}(l_1) \tag{42}$$

$$\underline{\alpha}_{ff}^Q = \left(\text{diag}(\underline{Q}_{Gff}^{max}(l))\right)^{-1} \cdot \underline{Q}_{Gff}(l_1) \tag{43}$$

where the values of the coefficients contained in the vectors $$\underline{\alpha}_{fn}^P, \underline{\alpha}_{fn}^Q, \alpha_{ff}^P \text{ and } \underline{\alpha}_{ff}^Q$$

are limited between 0 and 1, and these coefficients are used to control the injection of active and reactive power of each DER in operation in the microgrid, so that:

The references of active and reactive power for the control cycle $l_1$ of the j-th DER connected between phase m and neutral are calculated by:

The references of active and reactive power for the control cycle $l_1$ of the $$P_{Gj}^*(l_1) = \alpha_{fn_m}^P \cdot P_{Gj}^{max}(l), Q_{Gj}^*(l_1) = \alpha_{fn_m}^Q \cdot Q_{Gj}^{max}(l); \tag{44}$$

j-th DER connected between phase m and n are calculated by:

The process presented herein can be used to control a low voltage $$P_{Gj}^*(l_1) = \alpha_{ff_{mn}}^P \cdot P_{Gj}^{max}(l), Q_{Gj}^*(l_1) = \alpha_{ff_{mn}}^Q \cdot Q_{Gj}^{max}(l). \tag{45}$$

microgrid.

The present invention can be better understood through the non-limiting examples below.

EXAMPLE 1

Computer Simulation Results of the Technology

A study based on a computer simulation of a microgrid controlled by the methods of PBC (state of the art) and MPBC proposed herein was carried out using the MATLAB/SIMULINK computer program as detailed at https://doi.org/10.3390/en14196390. Comparatively, in favor of the MPBC methodology, a reduction in energy losses was obtained, which reached 4.85% less than the PBC. The reduction in accommodation time, the time needed to reach power references, was about 83% less compared to the PBC methodology.

The invention claimed is:

1. A process for controlling low voltage microgrids, characterized in that it comprises the following steps:
   a) Temporarily delimiting a control cycle l, with the next control cycle defined as $l_1=l+1$;
   b) Assigning the following vectors $P_{PCC_x}(l)$ and $Q_{PCC_x}(l)$, which are vectors that indicate the active and reactive powers exchanged with the main grid from the three phases of the microgrid (MG) and the respective references $$\underline{P}_{PCC_x}^*(l_1) \text{ and } \underline{Q}_{PCC_x}^*(l_1),$$

where the terms with the subscript ($\square_{PCC_x}$) are provided by the grid at the controlled point of common coupling (PCC) and terms with superscript (*) indicate the power references for the respective ($\square_{PCC_x}$) where x is the numeric identification of the PCC in which the control process is applied, and the indices m or mn indicate the phases of the three-phase system in the context of the phase-neutral and phase-phase connection types, respectively;

c) Steering the power references $$\left[ P^*_{PCC_x}(l_1) \text{ and } Q^*_{PCC_x}(l_1) \right]$$

using the central control, located in the secondary control layer, which transmits command instructions to the distributed energy resources (DER) according to their connection types in the MG, which can be phase-phase or phase-neutral to determine the powers to be generated individually, wherein the powers are calculated by sub-steps i to iv, namely:

i. Homopolar powers $$P^{ho}_{PCC_x}(l) \text{ and } Q^{ho}_{PCC_x}(l):$$

the power components for these vectors are calculated for each phase of the PCC considering only the homopolar components (ho) of current that are calculated by expression (1);

$$i^{ho} = \frac{1}{3} \sum_{m=1}^{3} i_m \tag{1}$$

ii. Expression 2 is used to equate the characteristics inherent to homopolar currents, expressions 3 and 4 calculate the vectors of non-homopolar powers (nho) in each phase of the PCC;

$$\sum_{m=1}^{M} P^{ho}_{PCC_xm} = \sum_{m=1}^{M} Q^{ho}_{PCC_xm} = 0 \tag{2}$$

$$P^{nho}_{PCC_x}(l) = P_{PCC_x}(l) - P^{ho}_{PCC_x}(l) \tag{3}$$

$$Q^{nho}_{PCC_x}(l) = Q_{PCC_x}(l) - Q^{ho}_{PCC_x}(l) \tag{4}$$

where M is the number of phases of the $P_{CC_x}$ (in general, M=3);

iii. Balanced powers $$\left( P^b_{PCC_x}(l) \text{ and } Q^b_{PCC_x}(l) \right):$$

these vectors represent the portions of power consumed by a balanced load whose total powers are equivalent to the non-homopolar total powers in the $PCC_x$, that is:

$$\sum_{m=1}^{M} P^b_{PCC_xm} = \sum_{m=1}^{M} P^{nho}_{PCC_xm}, \sum_{m=1}^{M} Q^b_{PCC_xm} = \sum_{m=1}^{M} Q^{nho}_{PCC_xm} \tag{5}$$

where the powers of the vectors $$P^b_{PAC_x} \text{ and } Q^b_{PAC_x}$$

are calculated as:

$$P^b_{PAC_xm} = \frac{\sum_{n=1}^{N} P^{nho}_{PAC_xn}}{\sum_{n=1}^{N} V_n^2} \cdot V_m^2, \quad Q^b_{PAC_xm} = \frac{\sum_{n=1}^{N} Q^{nho}_{PAC_xn}}{\sum_{n=1}^{N} \hat{V}_n^2} \cdot \hat{V}_m^2, \tag{6}$$

where V and $\hat{V}$ are the root mean square (rms) values of the phase-neutral voltages measured at the $PCC_x$ and the rms values of the respective voltage integrals, calculated by discounting their average value over time;

iv. The difference between the balanced portion of the power and the non-homopolar portion of the power is calculated, which results in the amount of "unbalanced" power (u) by expressions 7 and 8.

$$P^u_{PCC_x} = P^{nho}_{PCC_x} - P^b_{PCC_x} \tag{7}$$

$$Q^u_{PCC_x} = Q^{nho}_{PCC_x} - Q^b_{PCC_x} \tag{8}$$

wherein, based on equations (5), (7) and (8), it is possible to deduce that:

$$\sum_{m=1}^{M} P^u_{PCC_xm} = \sum_{m=1}^{M} Q^u_{PCC_xm} = 0; \tag{9}$$

d) Generating power transformation matrices: for DERs connected to the MG with phase-phase connection, the powers in the phase-phase configuration are converted into their respective phase-neutral values by a transformation that uses matrices A and B, detailed by expressions 10 and 11, and this conversion is made based on the Y–Δ transformations defined for impedance, generalized here in the form of matrices valid for any voltage conditions $$A = \begin{bmatrix} V_1^2 - \langle v_1, v_2 \rangle & 0 & V_1^2 - \langle v_3, v_1 \rangle \\ V_2^2 - \langle v_1, v_2 \rangle & V_2^2 - \langle v_2, v_3 \rangle & 0 \\ 0 & V_3^2 - \langle v_2, v_3 \rangle & V_3^2 - \langle v_3, v_1 \rangle \end{bmatrix} \tag{10}$$

$$B = \begin{bmatrix} \hat{V}_1^2 - \langle \hat{v}_1, \hat{v}_2 \rangle & 0 & \hat{V}_1^2 - \langle \hat{v}_3, \hat{v}_1 \rangle \\ \hat{V}_2^2 - \langle \hat{v}_1, \hat{v}_2 \rangle & \hat{V}_2^2 - \langle \hat{v}_2, \hat{v}_3 \rangle & 0 \\ 0 & \hat{V}_3^2 - \langle \hat{v}_2, \hat{v}_3 \rangle & \hat{V}_3^2 - \langle \hat{v}_3, \hat{v}_1 \rangle \end{bmatrix} \tag{11}$$

where $(v_1, v_2, v_3)$, $(\hat{v}_1, \hat{v}_2, \hat{v}_3)$, $(V_1, V_2, V_3)$, $(\hat{V}_1, \hat{V}_2, \hat{V}_3)$ are, respectively, the phase-neutral voltages and the corresponding homo-integrals and the respective rms values of the voltages and their homo-integrals, while the operator $\langle , \rangle$ corresponds to the internal product of two quantities that are functions of time, and, thus, with these matrices in hand, the powers between phases $$\left( \text{vectors } P_{ff} \text{ and } Q_{ff} \right)$$

can be converted to phase values $$\left(\text{vectors } \underline{P}_{fn}^{\square} \text{ and } \underline{Q}_{fn}^{\square}\right)$$

and vice versa using equations 12 and 13:

$$\underline{P}_{fn} = \underline{A} \cdot \left(\text{diag}(\underline{V}_{ff})\right)^{-1} \cdot \underline{P}_{ff} \leftrightarrow \underline{P}_{ff} = \text{diag}(\underline{V}_{ff}) \cdot \underline{A}^{-1} \cdot \underline{P}_{fn} \quad (12)$$

$$\underline{Q}_{fn} = \underline{B} \cdot \left(\text{diag}(\hat{\underline{V}}_{ff})\right)^{-1} \cdot \underline{Q}_{ff} \leftrightarrow \underline{Q}_{ff} = \text{diag}(\hat{\underline{V}}_{ff}) \cdot \underline{B}^{-1} \cdot \underline{Q}_{fn} \quad (13)$$

where the vectors $$\underline{V}_{ff}^{\square} \text{ and } \hat{\underline{V}}_{ff}^{\square}$$

contain the rms values of the voltages between phases and the respective homo-integrals of the phase-phase voltages, and the function diag($\square$) represents the transformation of a vector with m elements into a square matrix of order m whose elements of the main diagonal correspond to the elements of the original vector and the other elements are null;

e) Considering that J distributed generators are in operation in the MG during control cycle l, the quantities of interest of the j-th DER for the control algorithm are:
Active and reactive powers injected into the microgrid during cycle l:

$$P_{Gj}^{\square}(l), Q_{Gj}^{\square}(l);$$

Maximum active and reactive powers that the DER can inject into the grid during the cycle l:

$$P_{Gj}^{max}(l) \text{ and } Q_{Gj}^{max}(l);$$

In the case of energy storage systems, there is the minimum active power that can be absorbed from the microgrid in the cycle l:

$$P_{Gj}^{min}(l);$$

f) Performing the steps described below during the control cycle l, considering all information received from the distributed generators in operation and controllable PCCs:
Step 1: sums of active and reactive powers of the J DERs in operation and the X controllable PCCs for each phase m=1,2,3 and pair of phases mn=12,23,31:

$$P_{Gfn_m}(l) = \sum_{j=1}^{J} P_{Gj_m}(l), Q_{Gfn_m}(l) = \sum_{j=1}^{J} Q_{Gj_m}(l) \quad (14)$$

$$P_{Gff_{mn}}(l) = \sum_{j=1}^{J} P_{Gj_{mn}}(l), Q_{Gff_{mn}}(l) = \sum_{j=1}^{J} Q_{Gj_{mn}}(l) \quad (15)$$

-continued $$P_{Gfn_m}^{max}(l) = \sum_{j=1}^{J} P_{Gj_m}^{max}(l), Q_{Gfn_m}^{max}(l) = \sum_{j=1}^{J} Q_{Gj_m}^{max}(l) \quad (16)$$

$$P_{Gff_{mn}}^{max}(l) = \sum_{j=1}^{J} P_{Gj_{mn}}^{max}(l), Q_{Gff_{mn}}^{max}(l) = \sum_{j=1}^{J} Q_{Gj_{mn}}^{max}(l) \quad (17)$$

$$P_{PCC_m}(l) = \sum_{x=1}^{X} P_{PCC_x m}(l), Q_{PCC_m}(l) = \sum_{x=1}^{X} Q_{PCC_x m}(l) \quad (18)$$

$$P_{PCC_m}^{*}(l_1) = \sum_{x=1}^{X} P_{PCC_x m}^{*}(l_1), Q_{PCC_m}^{*}(l_1) = \sum_{x=1}^{X} Q_{PCC_x m}^{*}(l_1) \quad (19)$$

$$P_{PCC_m}^{ho}(l) = \sum_{x=1}^{X} P_{PCC_x m}^{ho}(l), Q_{PCC_m}^{ho}(l) = \sum_{x=1}^{X} Q_{PCC_x m}^{ho}(l) \quad (20)$$

$$P_{PCC_m}^{nho}(l) = \sum_{x=1}^{X} P_{PCC_x m}^{nho}(l), Q_{PCC_m}^{nho}(l) = \sum_{x=1}^{X} Q_{PCC_x m}^{nho}(l) \quad (21)$$

$$P_{PCC_m}^{b}(l) = \sum_{x=1}^{X} P_{PCC_x m}^{b}(l), Q_{PCC_m}^{b}(l) = \sum_{x=1}^{X} Q_{PCC_x m}^{b}(l) \quad (22)$$

$$P_{PCC_m}^{u}(l) = \sum_{x=1}^{X} P_{PCC_x m}^{u}(l), Q_{PCC_m}^{u}(l) = \sum_{x=1}^{X} Q_{PCC_x m}^{u}(l) \quad (23)$$

calculates the reference values of active and reactive powers for the generators $$P_{PCC_m}^{*}(l_1) = \sum_{x=1}^{X} P_{PCC_x m}^{*}(l_1), Q_{PCC_m}^{*}(l_1) \quad (19)$$

$$= \sum_{x=1}^{X} Q_{PCC_x m}^{*}(l_1)$$

$$P_{PCC_m}^{ho}(l) = \sum_{x=1}^{X} P_{PCC_x m}^{ho}(l), Q_{PCC_m}^{ho}(l) \quad (20)$$

$$= \sum_{x=1}^{X} Q_{PCC_x m}^{ho}(l)$$

distributed in control cycle $l_1$:
If only the DERs connected between phases are in operation, the power references for the pairs of phases mn=12,23,31 contained in the vectors $$\underline{P}_{Gff}^{\square}(l_1) \text{ and } \underline{Q}_{Gff}^{\square}(l_1)$$

are calculated using:

$$\underline{P}_{Gff}(l_1) = \text{diag}(\underline{V}_{ff}) \cdot \underline{A}^{-1} \cdot \left(\underline{P}_{PCC}^{b}(l) - \underline{P}_{PCC}^{*}(l_1)\right) + \underline{P}_{Gff}(l) \quad (24)$$

$$\underline{Q}_{Gff}(l_1) = \text{diag}(\hat{\underline{V}}_{ff}) \cdot \underline{B}^{-1} \cdot \left(\underline{Q}_{PCC}^{ho}(l) - \underline{Q}_{PCC}^{*}(l_1)\right) + \underline{Q}_{Gff}(l) \quad (25)$$

where the elements of vectors $$\underline{P}_{Gff}^{\square}(l), \underline{Q}_{Gff}^{\square}(l), \underline{P}_{PCC}^{*}(l_1), \underline{Q}_{PCC}^{*}(l_1), \underline{Q}_{PCC}^{nho}(l) \text{ and } \underline{P}_{PCC}^{b}(l)$$

are calculated by equations (15), (19), (21) and (22), respectively;

If only the DERs connected between phase and neutral are in operation, the power references for the phases m=1,2,3 contained in the vectors $$\underline{P}_{Gfn}^{\square}(l_1) \text{ and } \underline{Q}_{Gfn}^{\square}(l_1)$$

are calculated using:

$$\underline{P}_{Gfn}(l_1) = \underline{P}_{PCC}(l) - \underline{P}_{PCC}^*(l_1) + \underline{P}_{Gfn}(l) \tag{26}$$

$$\underline{Q}_{Gfn}(l_1) = \underline{Q}_{PCC}(l) - \underline{Q}_{PCC}^*(l_1) + \underline{Q}_{Gfn}(l) \tag{27}$$

where the elements of the vectors $$\underline{P}_{Gfn}^{\square}(l), \underline{Q}_{Gfn}^{\square}(l), \underline{P}_{PAC}^{\square}(l) \text{ and } \underline{Q}_{PAC}^{\square}(l)$$

are calculated by equations (14) and (19), respectively;
    If distributed generators with both types of connection (phase-phase and phase-neutral) are in operation, a criterion for sharing some portions of active and reactive power is established based on the following coefficients:

$$\underline{c}_P(l) = \left(\mathrm{diag}\left(\underline{P}_{Gfn}^{max}(l) + \underline{P}_{Gfn}^{max\prime}(l)\right)\right)^{-1} \cdot \underline{P}_{Gfn}^{max}(l) \tag{28}$$

$$\underline{c}_Q(l) = \left(\mathrm{diag}\left(\underline{Q}_{Gfn}^{max}(l) + \underline{Q}_{Gfn}^{max\prime}(l)\right)\right)^{-1} \cdot \underline{Q}_{Gfn}^{max}(l) \tag{29}$$

where the elements of the vectors $$\underline{P}_{Gfn}^{max}(l) \text{ and } \underline{Q}_{Gfn}^{max}(l)$$

are calculated by equations (16), while the elements of the vectors $$\underline{P}_{Gfn}^{max\prime}(l) \text{ and } \underline{Q}_{Gfn}^{max\prime}(l)$$

are calculated by using:

$$\underline{P}_{Gfn}^{max\prime}(l) = \underline{A} \cdot \left(\mathrm{diag}(\underline{V}_{ff})\right)^{-1} \cdot \underline{P}_{Gff}^{max}(l) \tag{30}$$

$$\underline{Q}_{Gfn}^{max\prime}(l) = \underline{B} \cdot \left(\mathrm{diag}(\hat{\underline{V}}_{ff})\right)^{-1} \cdot \underline{Q}_{Gff}^{max}(l) \tag{31}$$

where the elements of the vectors $$\underline{P}_{Gff}^{max}(l) \text{ and } \underline{Q}_{Gff}^{max}(l)$$

are calculated by equations (17), and, $$\underline{P}_{fn}^{sh}(l) = \mathrm{diag}(\underline{c}_P(l)) \cdot \left(\underline{P}_{PAC}^b(l) - \underline{P}_{PAC}^*(l_1)\right) \tag{32}$$

$$\underline{Q}_{fn}^{sh}(l) = \mathrm{diag}(\underline{c}_Q(l)) \cdot \left(\underline{Q}_{PAC}^b(l) - \underline{Q}_{PAC}^*(l_1)\right) \tag{33}$$

-continued $$P_{fn}^{sh\prime}(l) = \left(\underline{1} - \mathrm{diag}(\underline{c}_P(l))\right) \cdot \left(\underline{P}_{PAC}^b(l) - \underline{P}_{PAC}^*(l_1)\right) \tag{34}$$

$$\underline{Q}_{fn}^{sh\prime}(l) = \left(\underline{1} - \mathrm{diag}(\underline{c}_Q(l))\right) \cdot \left(\underline{Q}_{PAC}^b(l) - \underline{Q}_{PAC}^*(l_1)\right) \tag{35}$$

therefore, the power sharing is defined as:
where 1 is the identity matrix, and, finally, the power references for the phases and pairs of phases are calculated as a function of the vectors $$\underline{P}_{fn}^{sh}(l), \underline{Q}_{fn}^{sh}(l), \underline{P}_{fn}^{sh\prime}(l) \text{ and } \underline{Q}_{fn}^{sh\prime}(l):$$

$$\underline{P}_{Gff}(l_1) = \left(\mathrm{diag}(\underline{V}_{ff}) \cdot \underline{A}^{-1} \cdot \underline{P}_{fn}^{sh\prime}(l)\right) + \underline{P}_{Gff}(l) \tag{38}$$

$$\underline{Q}_{Gff}(l_1) = \left(\mathrm{diag}(\hat{\underline{V}}_{ff}) \cdot \underline{B}^{-1} \cdot \underline{Q}_{fn}^{sh\prime}(l)\right) + \underline{Q}_{Gff}(l); \tag{39}$$

Step 3:
    calculation of power coefficients:
        For phases m=1,2,3:

$$\alpha_{fn}^P = \left(\mathrm{diag}(\underline{P}_{Gfn}^{max}(l))\right)^{-1} \cdot \underline{P}_{Gfn}(l_1) \tag{40}$$

$$\alpha_{fn}^Q = \left(\mathrm{diag}(\underline{Q}_{Gfn}^{max}(l))\right)^{-1} \cdot \underline{Q}_{Gfn}(l_1) \tag{41}$$

For the pairs of phases mn=12,23,31:

$$\alpha_{ff}^P = \left(\mathrm{diag}(\underline{P}_{Gff}^{max}(l))\right)^{-1} \cdot \underline{P}_{Gff}(l_1) \tag{42}$$

$$\alpha_{ff}^Q = \left(\mathrm{diag}(\underline{Q}_{Gff}^{max}(l))\right)^{-1} \cdot \underline{Q}_{Gff}(l_1) \tag{43}$$

where the values of the coefficients contained in the vectors $$\alpha_{fn}^P, \alpha_{fn}^Q, \alpha_{ff}^P \text{ and } \alpha_{ff}^Q$$

are limited between 0 and 1, and these coefficients are used to control the injection of active and reactive power of each DER in operation in the microgrid, so that:
    The references of active and reactive power for the control cycle $l_1$ of the j-th DER connected between phase m and neutral are calculated by:

$$P_{Gj}^*(l_1) = \alpha_{fn_m}^P \cdot P_{Gj}^{max}(l), Q_{Gj}^*(l_1) = \alpha_{fn_m}^Q \cdot Q_{Gj}^{max}(l); \tag{44}$$

The references of active and reactive power for the control cycle $l_1$ of the j-th DER connected between phase m and n are calculated by:

$$P_{Gj}^*(l_1) = \alpha_{ff_{mn}}^P \cdot P_{Gj}^{max}(l), Q_{Gj}^*(l_1) = \alpha_{ff_{mn}}^Q \cdot Q_{Gj}^{max}(l). \tag{45}$$

*   *   *   *   *